(12) United States Patent
Chen

(10) Patent No.: US 10,299,574 B1
(45) Date of Patent: May 28, 2019

(54) PLUGGING ROD CONNECTOR

(71) Applicant: SHIN FANG PLASTIC INDUSTRIAL CO., LTD., Taichung (TW)

(72) Inventor: Yen-Yu Chen, Taichung (TW)

(73) Assignee: SHIN FANG PLASTIC INDUSTRIAL CO., LTD., Taichung (TW)

( * ) Notice: Subject to any disclaimer, the term of this patent is extended or adjusted under 35 U.S.C. 154(b) by 89 days.

(21) Appl. No.: 15/804,480

(22) Filed: Nov. 6, 2017

(51) Int. Cl.
*A45F 5/02* (2006.01)
*F16B 2/20* (2006.01)
*F16M 13/02* (2006.01)
*A45F 3/14* (2006.01)
*A47F 5/08* (2006.01)
*A47F 5/00* (2006.01)

(52) U.S. Cl.
CPC .................. *A45F 5/02* (2013.01); *F16B 2/20* (2013.01); *F16M 13/022* (2013.01); *A45F 3/14* (2013.01); *A45F 2003/144* (2013.01); *A47F 5/0006* (2013.01); *A47F 5/0838* (2013.01); *Y10T 24/1391* (2015.01); *Y10T 24/44752* (2015.01)

(58) Field of Classification Search
CPC ........ A45F 5/02; A45F 3/14; A45F 2003/144; A47F 5/0006; A47F 5/0838; A45C 13/30; F16M 13/022; F16B 2/20; Y10T 24/1391; Y10T 24/44752
See application file for complete search history.

(56) References Cited

U.S. PATENT DOCUMENTS

| 5,533,656 A * | 7/1996 | Bonaldi | A45C 1/04 224/269 |
| 6,279,804 B1 * | 8/2001 | Gregg | A45F 5/02 2/255 |
| 6,510,592 B1 * | 1/2003 | Hamilton | A44B 11/06 24/170 |
| 7,526,842 B2 * | 5/2009 | Wemmer | A41D 27/20 24/3.7 |
| 8,079,503 B1 * | 12/2011 | Yeates | A45C 7/0086 224/268 |
| 8,171,602 B1 * | 5/2012 | Zauhar | A45F 5/00 131/178 |

(Continued)

*Primary Examiner* — Eret C McNichols
(74) *Attorney, Agent, or Firm* — Egbert Law Offices, PLLC

(57) ABSTRACT

A plugging rod connector includes a long plugging rod and a buckle device configured on the plugging rod. The buckle device has a positioning component on the top of the plugging rod. A crevice is formed between the positioning component and plugging rod. The two sides of the positioning component are respectively configured with a first locking component. An operation component having an operational portion is pivoted on the positioning component. The two sides of the operational portion are respectively configured with two parallel extension rods. A pivot shaft has its two ends being respectively perpendicular to the corresponding extension rods, making the operation component into a square-mouth shaped structure. The inner sides of the extension rods are respectively configured with a second locking component. The two second locking components are locked onto the corresponding first locking components, so that the operation component is temporarily unable to rotate or swing.

8 Claims, 8 Drawing Sheets

(56) References Cited

U.S. PATENT DOCUMENTS

| | | | | |
|---|---|---|---|---|
| 8,336,171 B2* | 12/2012 | Colorado | ............... | A45F 3/10 |
| | | | | 224/675 |
| 8,544,704 B2* | 10/2013 | Fitzpatrick | ............ | A41H 31/00 |
| | | | | 223/102 |
| 8,595,903 B2* | 12/2013 | Miltner | ................ | A45F 5/02 |
| | | | | 24/3.11 |
| 8,713,764 B1* | 5/2014 | Rittenhouse | ............ | A45F 5/02 |
| | | | | 24/3.11 |
| 8,826,462 B2* | 9/2014 | Storms, Jr. | ............ | A41D 1/04 |
| | | | | 2/2.5 |
| 9,579,811 B2* | 2/2017 | Prince | ................ | B26B 29/025 |
| 9,664,481 B2* | 5/2017 | Alcantra | .............. | A41D 3/00 |
| 9,867,455 B1* | 1/2018 | Merton, Sr. | ............ | A45F 5/02 |
| 9,872,954 B2* | 1/2018 | Crane | ............ | A61M 5/14244 |
| 9,913,527 B1* | 3/2018 | Merton, Sr. | ............ | A45F 5/02 |
| 10,080,423 B1* | 9/2018 | Bandlow | ............ | A45C 13/30 |
| 2005/0015943 A1* | 1/2005 | Wemmer | ......... | A41D 13/0012 |
| | | | | 24/580.1 |
| 2009/0307878 A1* | 12/2009 | Kadas | ................ | A45F 5/02 |
| | | | | 24/303 |
| 2013/0047386 A1* | 2/2013 | Barfoot | ............ | A47F 5/0006 |
| | | | | 24/580.1 |
| 2018/0014626 A1* | 1/2018 | Tang | ................ | A45F 5/00 |

* cited by examiner

PLUGGING ROD CONNECTOR

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a connector, and more particularly to an innovative structural design which can mount a supported object on a supporting body in a removable manner.

2. Description of Related Art Including Information Disclosed Under 37 CFR 1.97 and 37 CFR 1.98

A plugging rod connector is a structure facilitating fast installation of a supported object C on a supporting body D. As shown in FIG. 8, the supported object C is configured with at least one first pierced ear C1 and one locking block C2, and the supporting body D is configured with at least one row of second pierced ears D1. Firstly, the first pierced ears C1 and second pierced ears D1 are aligned vertically, leaving the first pierced ears C1 and second pierced ears D1 in an interlaced distribution. Then, thrust a plugging rod E with a locking hole E1 on its bottom end into the vertically aligned pierced ears, letting the locking block C2 be locked into the locking hole E1, so that the plugging rod E is fixed. Thus, installation of the supported object C is completed.

However, in actual applications of this prior-art structure, there are still some problems. The locking facilities of the prior-art plugging rod connector are respectively configured on the two main structures (connector and supported object C). Therefore, in applications, the supported object C must match the plugging rod connector. As a result, the supported object C and supporting body D can not be fully modularized. Naturally, alternative usages as needed are not possible. This greatly limits the application range of the plugging rod connector, and reduces the compatibility of the plugging rod connector.

BRIEF SUMMARY OF THE INVENTION

Based on the innovative designs of the positioning component and operation component of the buckle device of the plugging rod, the present invention provides a structure and operational mode that can facilitate complete modularization of the supported object and supporting body and application on MOLLE. In actual applications, the user can quickly change equipment at any time according to meet the specific demands of different tasks. This can help enhancing task-fulfilling efficiency, or even survival rate in battles or war games. Hence, the present invention has a practical inventive step.

DETAILED DESCRIPTION OF THE INVENTION

The plugging rod connector disclosed in the present invention is mainly used on Modular Lightweight Load-Carrying Equipment (MOLLE). It is used to install a supported object A (such as: first-aid kit or magazine pouch) on a supporting body B (such as: rucksack or tactical combat vest) in a removable manner. The plugging rod connector is optionally fixed on the supporting body B, so that the user can quickly change equipment at any time according to specific demands of different tasks. This can help enhancing task-fulfilling efficiency, or even survival rate in battles or war games.

Figure 1:
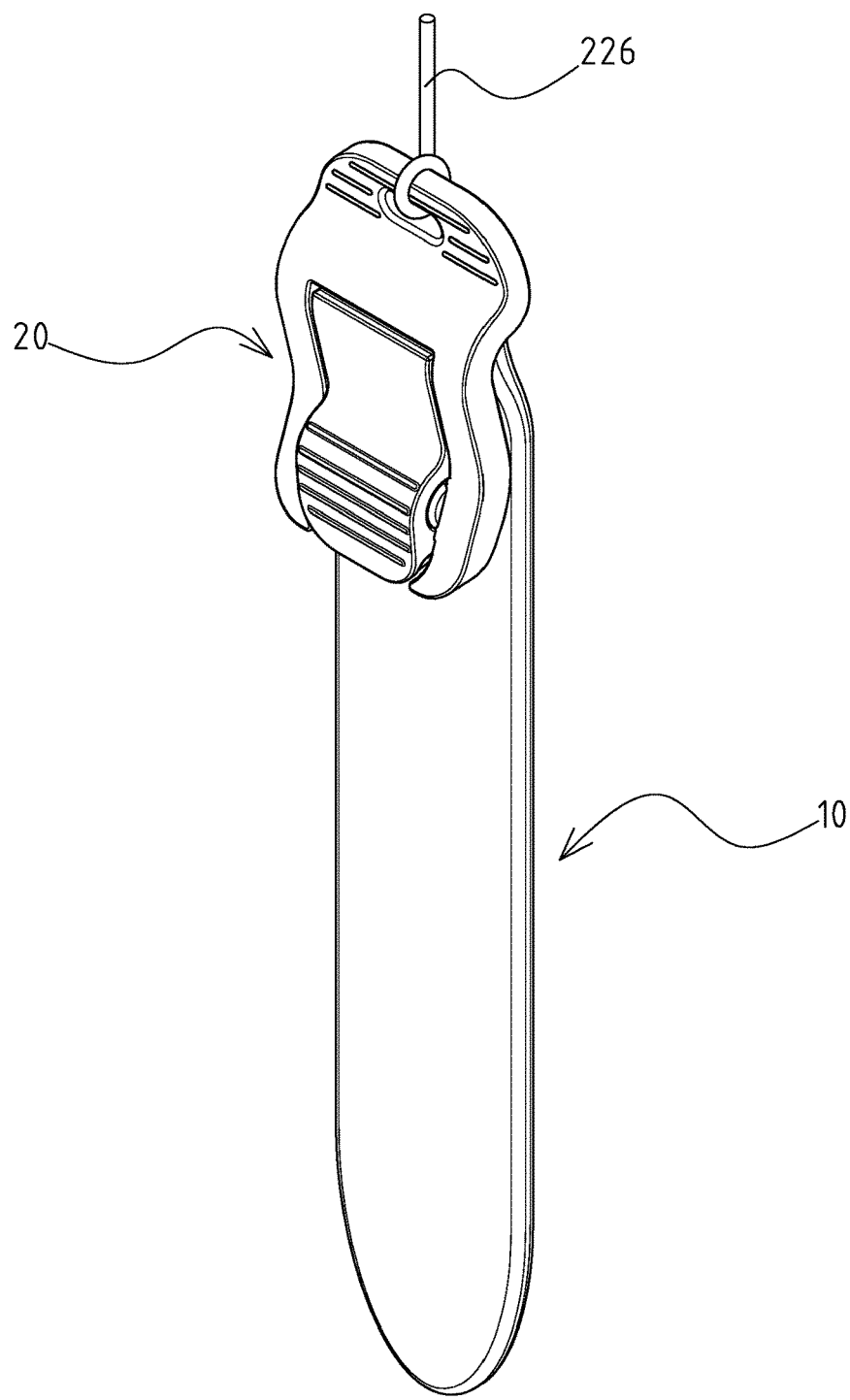
FIG. 1 is a perspective view of the present invention in the locked state.
Figure 2:
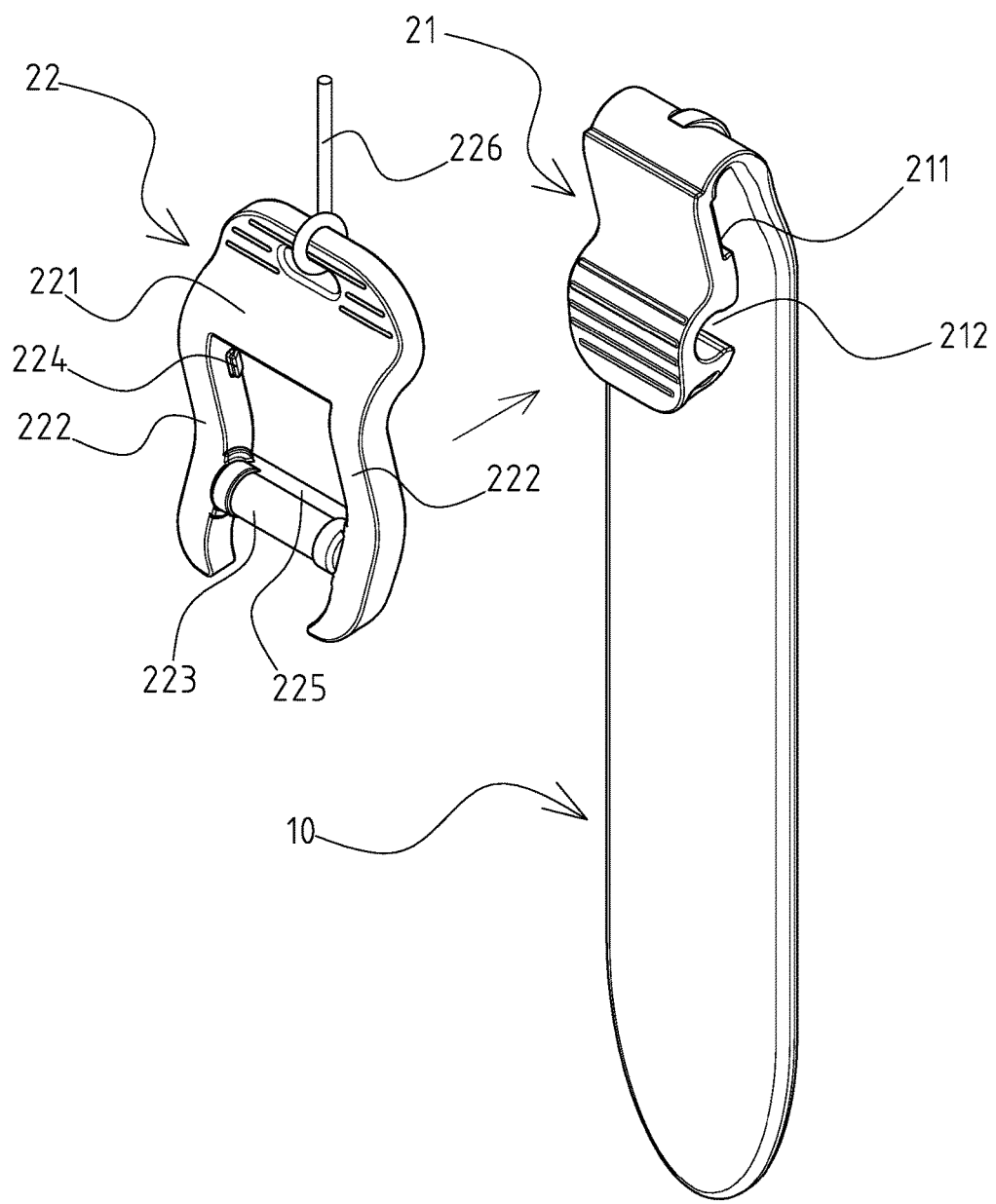
FIG. 2 is a perspective exploded view of the present invention.
Figure 3:
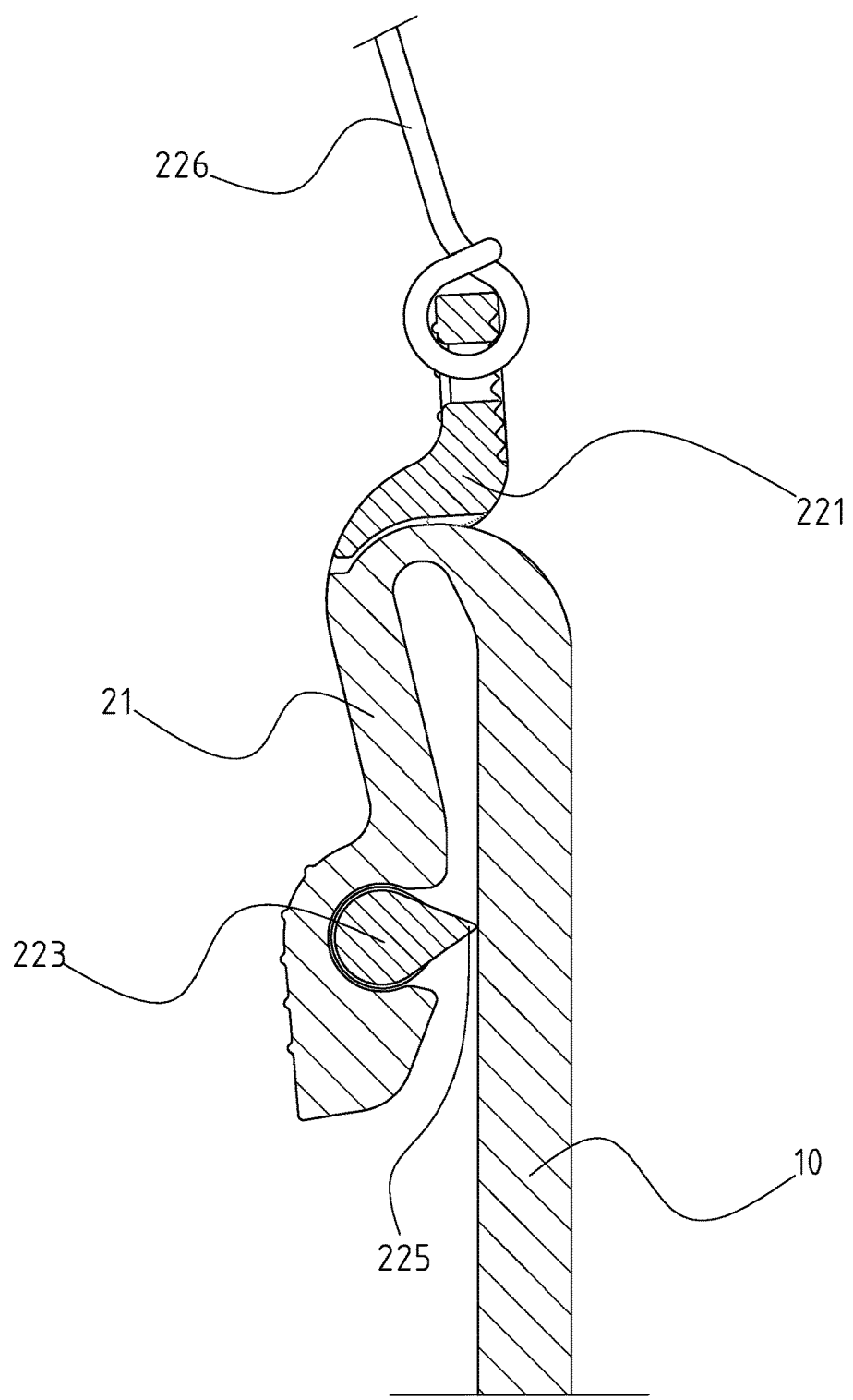
FIG. 3 is a local sectional view of the present invention in the locked state.

FIGS. 1, 2, 3 depict a preferred embodiment of the present invention of a plugging rod connector. However, it is to be understood that such an embodiment is illustrative only and is not intending to limit the scope of the invention either in application or in explanation. The plugging rod connector comprises a long plugging rod 10 and a buckle device 20 configured on the plugging rod 10. Said buckle device 20 comprises a positioning component 21 connected to the top of the plugging rod 10 and an operation component 22 pivoted to the positioning component 21. The operation component 22 is optionally locked and fixed on the positioning component 21.

A crevice is formed between the positioning component 21 and the plugging rod 10. The positioning component 21 is an elastic plate and extends downward along the axial line of the plugging rod 10. The two sides of the positioning component 21 are respectively configured with a first locking component 211, and the back side of the positioning component 21 is transversely formed with a housing slot 212 with a U-shape section. In the preferred embodiment of the present invention, the two first locking components 211 are respectively a gap.

Figure 4:
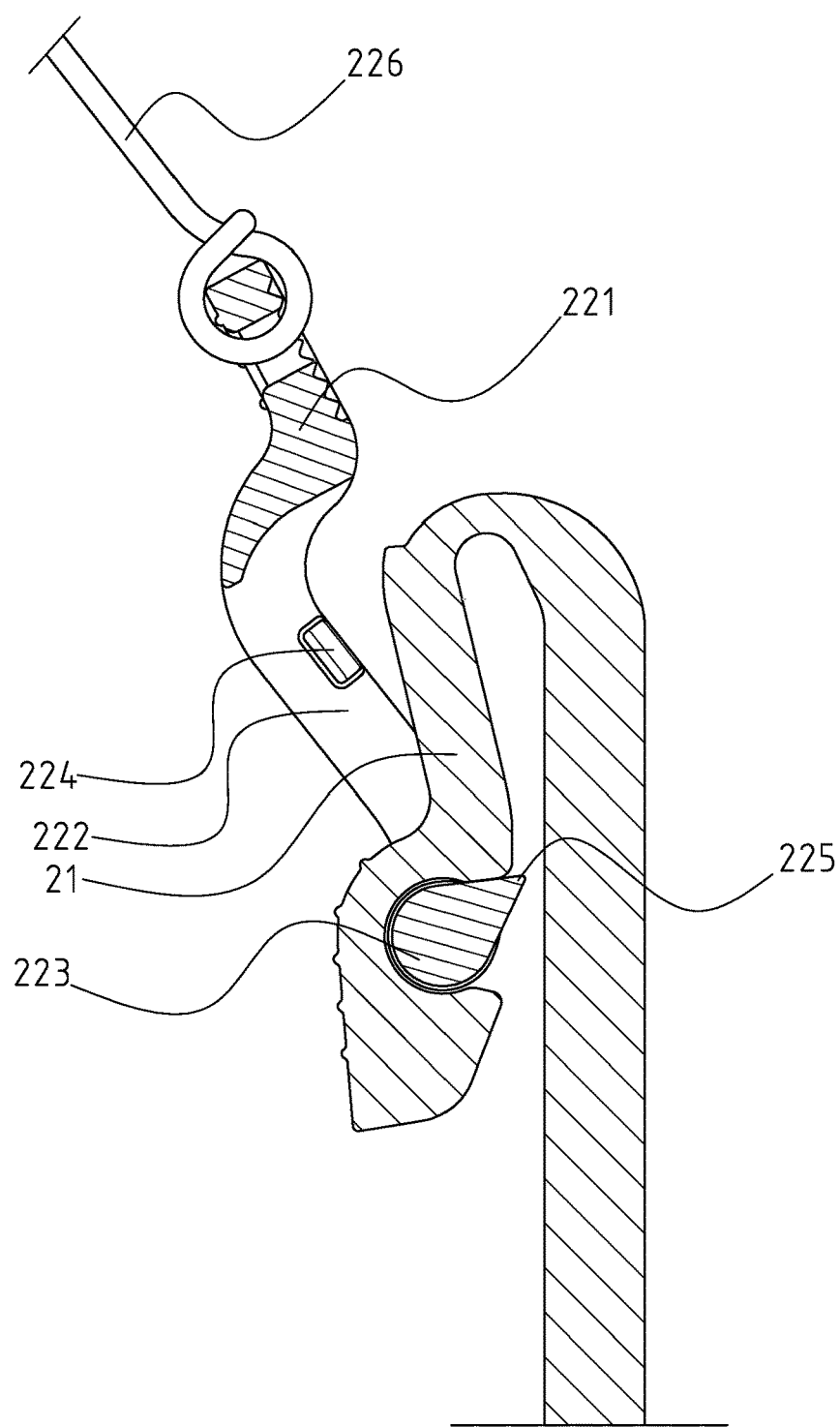
FIG. 4 is a local sectional view of the present invention in the released state.

Said operation component 22 comprises an operational portion 221, the two sides of the operational portion 221 being respectively configured with two parallel extension rods 222. A pivot shaft 223 with its two ends being respectively perpendicular to the corresponding extension rods 222 is provided, making the operation component 22 into a square-mouth shaped structure. Said pivot shaft 223 is placed into the housing slot 212 in a rotational manner; In particular, the inner sides of the extension rods 222 are respectively configured with a second locking component 224. The two second locking components 224 are respectively and optionally locked and fixed onto the corresponding first locking components 211, so that the operation component 22 is temporarily unable to rotate or swing in relation to the positioning component 21. In the preferred embodiment of the present invention, the two second locking component 224 are respectively a raised boss; referring further to FIGS. 3, 4, 6, the back side of the operation component 22 is transversely configured with at least one butting component 225. When the first locking component 211 is locked and fixed with the second locking component 224, the butting component 225 is pressed on the supporting body B. When the first locking component 211 is released and separated from the second locking component 224, the butting component 225 is pressed on the corresponding side of the housing slot 212, so as to limit the swing angle of the operation component 22 in relation to the positioning component 21. In the preferred embodiment of the present invention, the butting component 225 is transversely configured on the pivot shaft 223.

The operational portion 221 of the operation component 22 is attached with a pulling rope 226, so that the user can quickly and repeatedly trigger the operation component 22 through the pulling rope 226.

Figure 5:
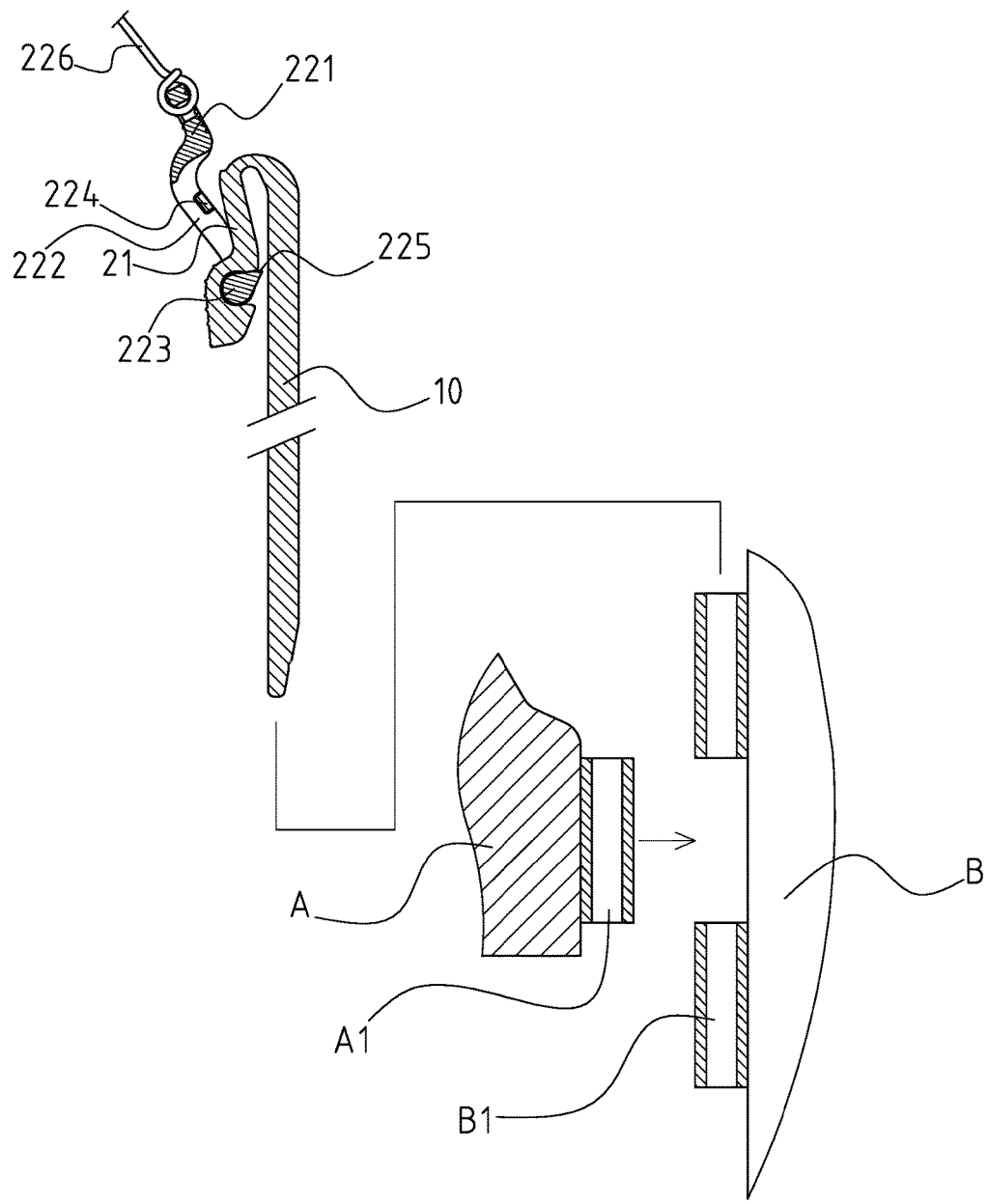
FIG. 5 is an operational view of the present invention to combine the supported object and supporting body.
Figure 6:
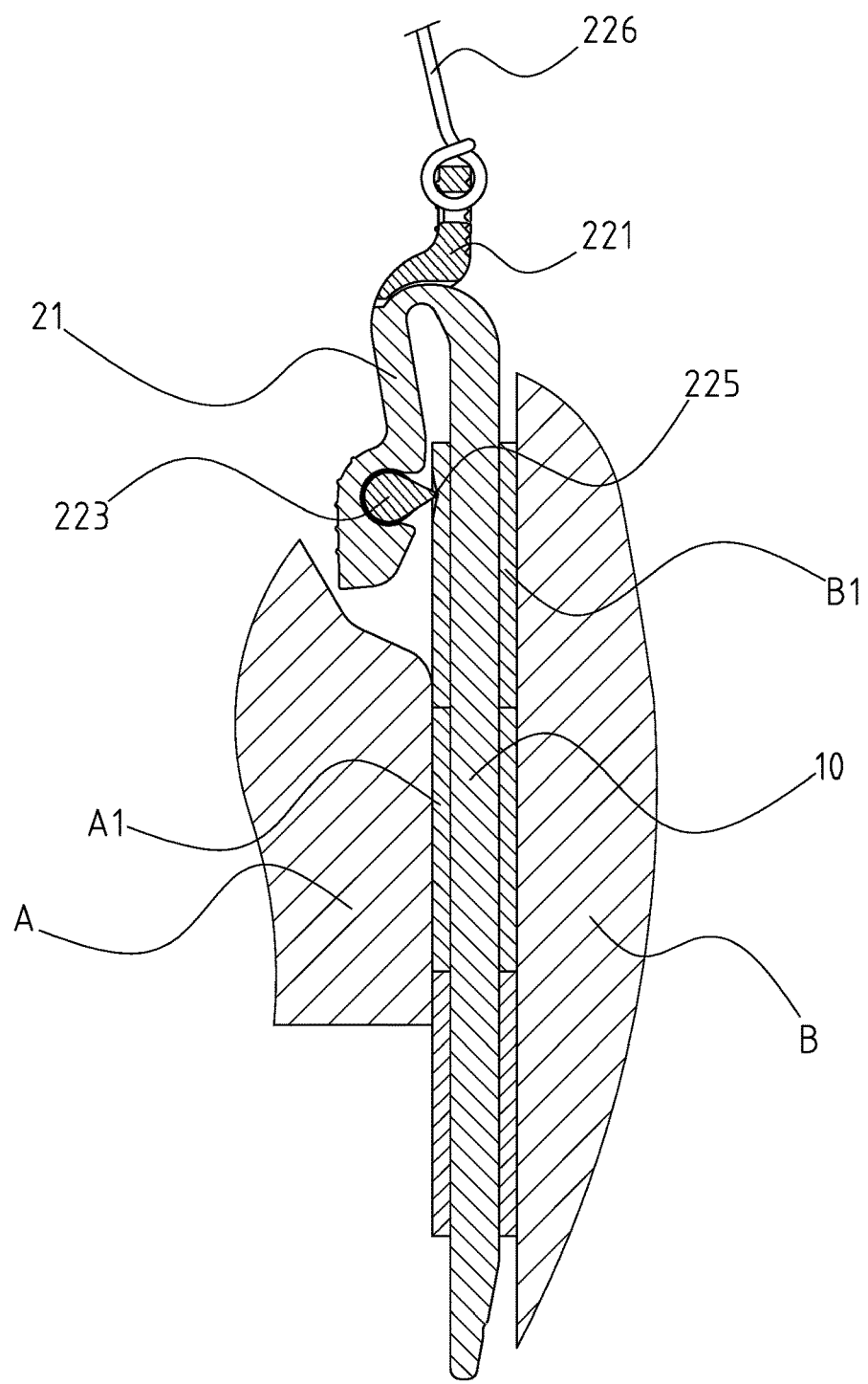
FIG. 6 is a sectional view of the present invention after completion of the insertion and combination.
Figure 7:
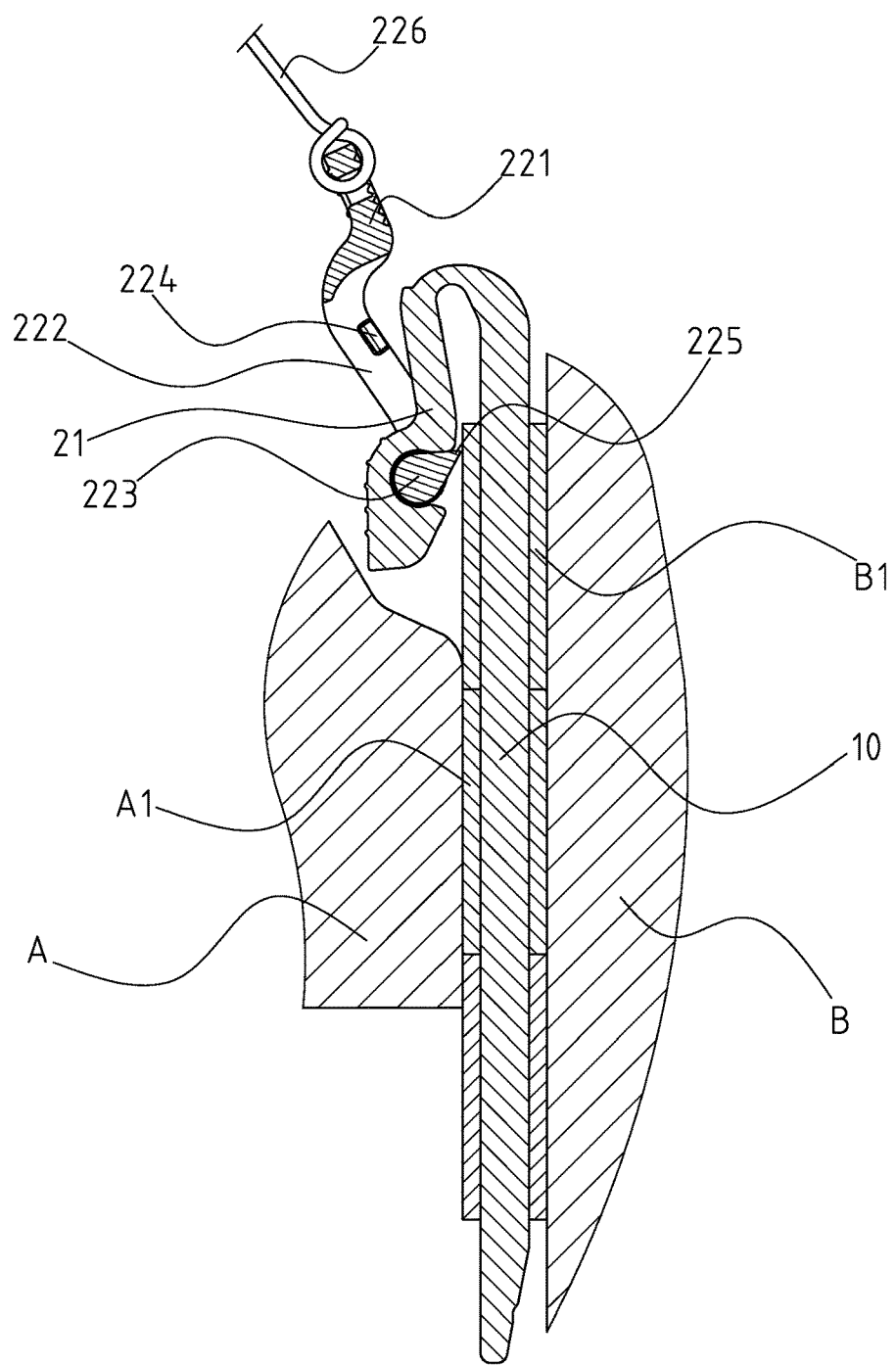
FIG. 7 is a sectional view of the present invention in the released state to remove the supported object.
Figure 8:
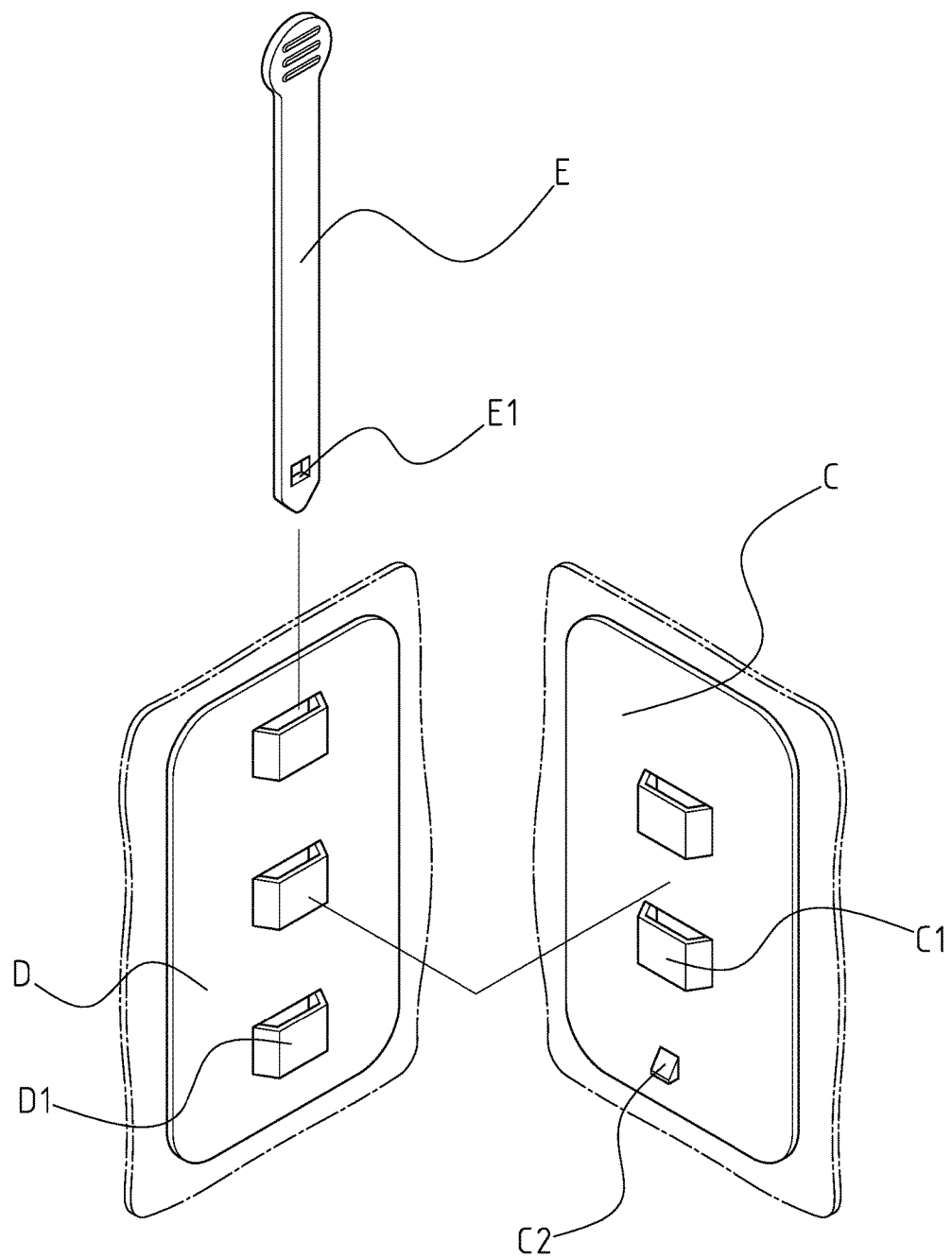
FIG. 8 is an operational view of the prior-art plugging rod connector.

Based on the above structural design, the operation of the present invention is as follows: referring to FIGS. 5, 6, 7, the supported object A is configured with at least one first pierced ear A1, and the supporting body B is configured with at least one row of second pierced ears B1. Firstly, align the first pierced ear A1 and second pierced ears B1 longitudinally, leaving the first pierced ear A1 and second pierced ears B1 in an interlaced distribution. Thrust the plugging rod 10 with the first locking component 211 and second locking components 224 unlocked and separated into the longitudinally aligned first pierced ear A1 and second pierced ears B1. Then, use the pulling rope 226 or directly use the operational portion 221 to pull the operation component 22 toward the plugging rod 10, so that the first locking component 211 and second locking component 224 are locked to each other, and meanwhile, the butting component 225 is pressed on the first/second pierced ear A1/B1. Thus, the supported object A is installed on the supporting body B. In the installation mode shown in the drawings of the present invention, the butting component 225 is pressed on the second pierced ear B1 of the supporting body B. To remove the supported object A, the user can use the pulling rope 226 or directly use the operational portion 221 to pull the operation component 22 forward, so that the first locking component 211 and second locking component 224 are separated from each other, and meanwhile the butting component 225 is released from the first/second pierced ear A1/B1. Thus, the plugging rod 10 of the present invention can be pulled out of the first pierced ear A1 and second pierced ear B1, and the supported object A is removed.

I claim:

1. A plugging rod connector, mainly used to install a supported object A onto a supporting body B in a removable manner, said plugging rod connector is optionally fixed on the supporting body B, and comprises:
    a long plugging rod; and
    a buckle device configured on the plugging rod, said buckle device including:
        a positioning component connected on the top of the plugging rod; a crevice is formed between the positioning component and the plugging rod; the two sides of the positioning component are respectively configured with a first locking component, and the back side of the positioning component is transversely formed with a housing slot with a U-shape section; and
        an operation component pivoted on the positioning component; said operation component comprises an operational portion; the two sides of the operational portion are respectively configured with two parallel extension rods; a pivot shaft with its two ends being respectively perpendicular to the corresponding extension rods, making the operation component into a square-mouth shaped structure; the pivot shaft is placed into the housing slot in a rotational manner; the inner sides of the extension rods are respectively configured with a second locking component; the two second locking components are respectively and optionally locked and fixed onto the corresponding first locking components, so that the operation component is temporarily unable to rotate or swing in relation to the positioning component; the back side of the operation component is transversely configured with at least one butting component; when the first locking component is locked and fixed with the second locking component, the butting component is pressed on the supporting body B; when the first locking component is released and separated from the second locking component, the butting component is pressed on the corresponding side of the housing slot, so as to limit the swing angle of the operation component in relation to the positioning component.

2. The connector defined in claim 1, wherein said butting component is transversely configured on the pivot shaft.

3. The connector defined in claim 2, wherein said two first locking components are respectively a gap, and said two second locking components are respectively a raised boss.

4. The connector defined in claim 3, wherein said operational portion of the operation component is attached with a pulling rope, so that the user can quickly and repeatedly trigger the operation component through the pulling rope.

5. The connector defined in claim 2, wherein said operational portion of the operation component is attached with a pulling rope, so that the user can quickly and repeatedly trigger the operation component through the pulling rope.

6. The connector defined in claim 1, wherein said two first locking components are respectively a gap, and said two second locking components are respectively a raised boss.

7. The connector defined in claim 6, wherein said operational portion of the operation component is attached with a pulling rope, so that the user can quickly and repeatedly trigger the operation component through the pulling rope.

8. The connector defined in claim 1, wherein said operational portion of the operation component is attached with a pulling rope, so that the user can quickly and repeatedly trigger the operation component through the pulling rope.

* * * * *